2 Sheets--Sheet 1.

W. SCHNEBLY.
Grain-Tallies.

No. 165,763. Patented July 20, 1875.

Witnesses:
M. C. Gillham.
Robt Gillham.

Inventor:
Wm Schnebly.

N. PETERS, PHOTO-LITHOGRAPHER, WASHINGTON, D. C.

2 Sheets--Sheet 2.

W. SCHNEBLY.
Grain-Tallies.

No. 165,763. Patented July 20, 1875.

Witnesses:
M. C. Gillham.
Robt. Gillham.

Inventor:
Wm. Schnebly.

UNITED STATES PATENT OFFICE.

WILLIAM SCHNEBLY, OF HACKENSACK, NEW JERSEY.

IMPROVEMENT IN GRAIN-TALLIES.

Specification forming part of Letters Patent No. 165,763, dated July 20, 1875; application filed April 21, 1875.

*To all whom it may concern:*

Be it known that I, WILLIAM SCHNEBLY, of Hackensack, Bergen county, and State of New Jersey, have invented an Improvement in Grain-Meters, of which the following is a specification:

My invention consists in giving a truthful result of any quantity or quality of grain to be measured or weighed in a continuous flow of column, whether it is to be delivered in specific or aggregate quantities, automatically. For this purpose I employ a hopper with beam and weight swinging on a fulcrum attached to a frame of suitable form; also, a wheel made with compartments similar to that of a water-wheel; also, a fixed hopper, with a port for the grain to pass through freely; also, a shifting valve to direct the flowing column to one or both sides alternately into inclined troughs below; also, geared wheels to operate an indicator, which result is effected by the gravity or height of the column.

Figure 1:
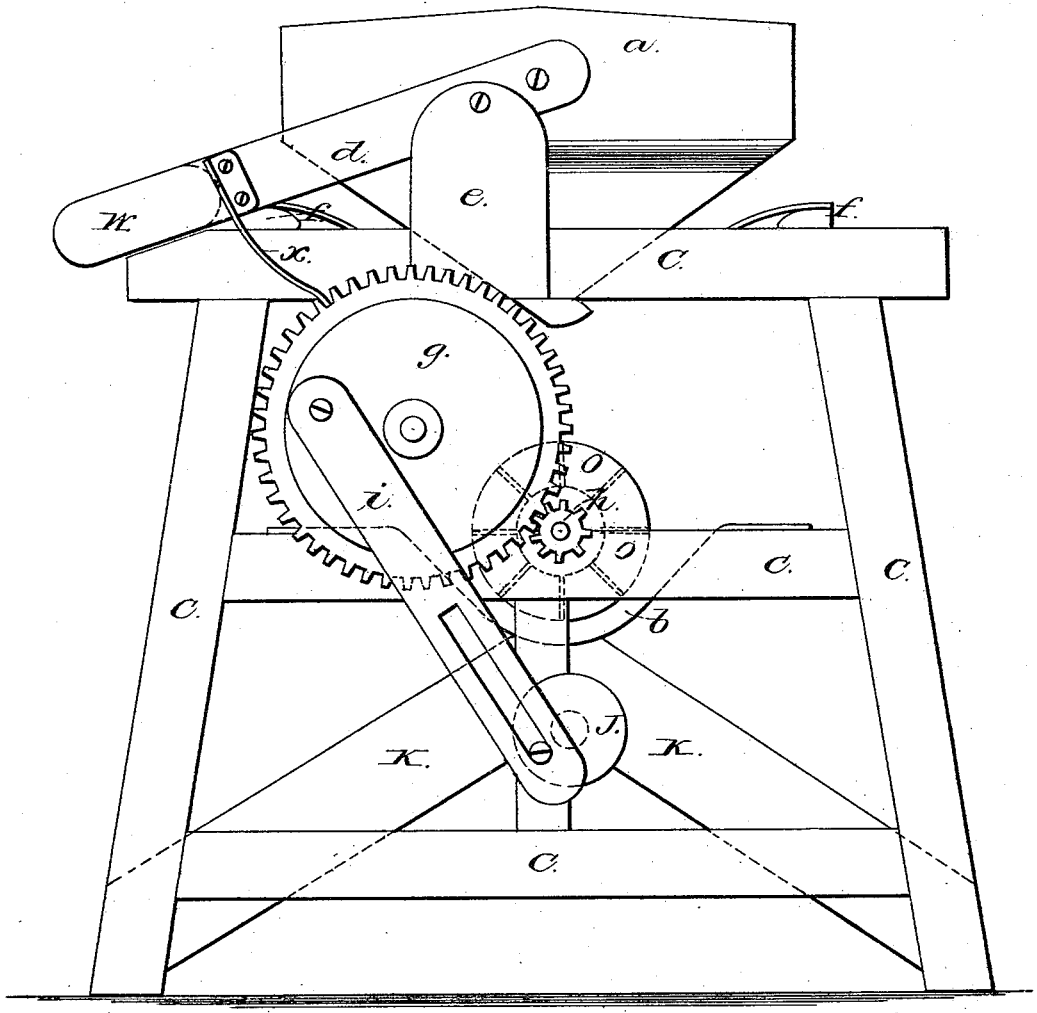

Figure 1 is a side view of the meter.

Figure 2:
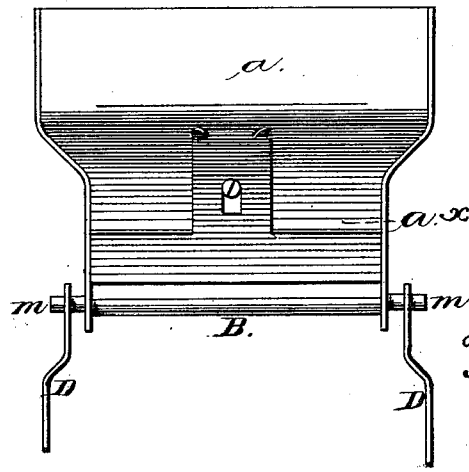
Figure 3:
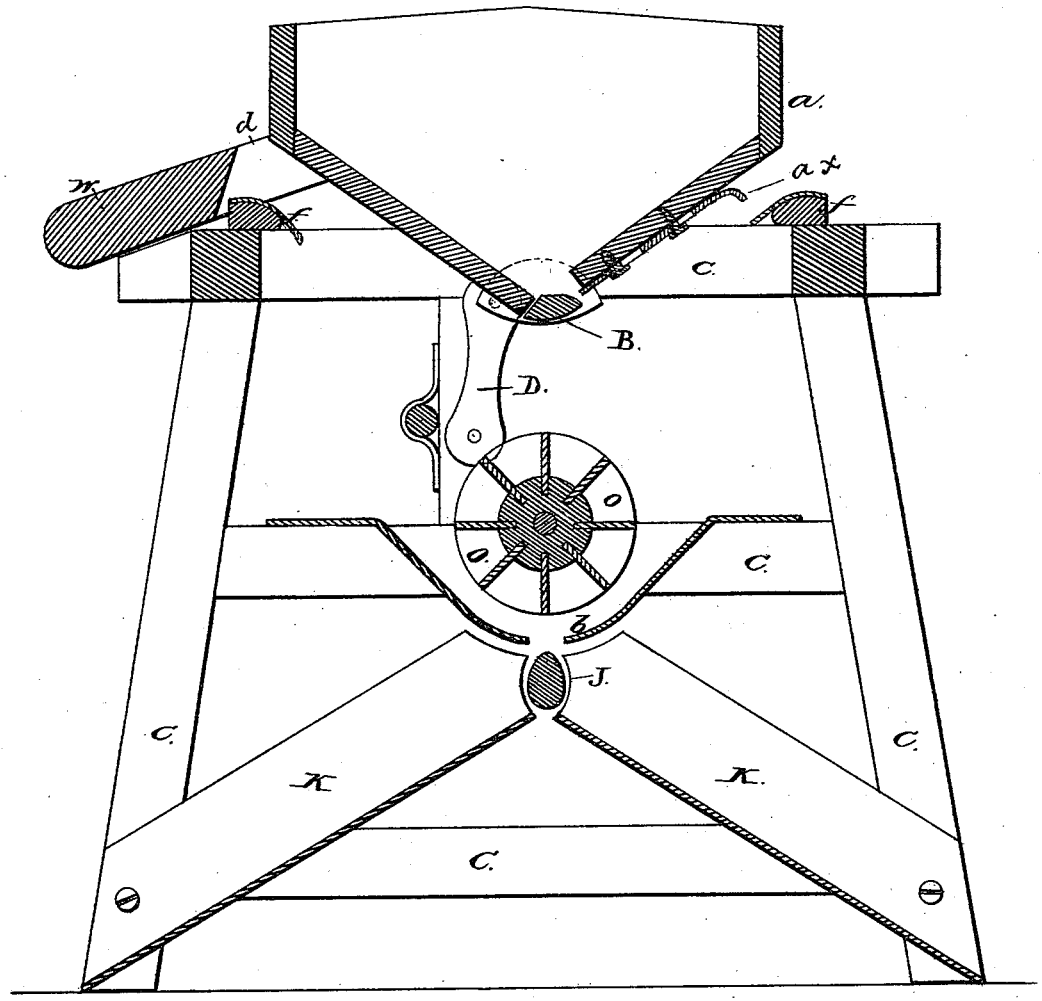
Figure 4:
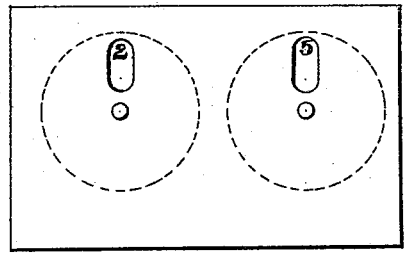

*a* represents the swinging hopper, with its beam *d*, weight *w* resting on its fulcrum *e*, attached to the frame *c c c*, on which bearers *f f* are placed to sustain the hopper *a* when down with grain in it, and to determine the point of its descent. This hopper *a* is provided with two gates, B and *a x*, as shown in Fig. 2. The gate B is hinged or pivoted on the sides of the port, having crank-pins *m m*, by which it is opened or closed to let out or cut off the flowing column in the descent and ascent of the hopper. This duty is effected by the connecting-bars D D, which are pivoted on the frame *c c*, and cranks *m m*. The gate *a x* is a sliding gate, used for the purpose of determining the capacity of the flowing column, which is to be adjusted to increase or diminish the column required or the quantity to be delivered. The wheel *o*, with its compartments and pinion *h*, has its axles resting on the side frame *c c*, and placed under the gate and port of hopper *a*, with a space between to prevent contact when rotating by the gravity of the column. Under the wheel *o* I locate a hopper, *b*, with sufficient space to prevent the grain from crowding, the hopper *b* having a port under the center of the wheel *o*, to permit the column to flow freely. Under the port of this hopper *a* is placed a shifting valve, J, resting on the side uprights of frame *c c*. Said shifting valve J is provided with a crank-pin on one end thereof, which has its movements made by the slotted bar *i*, pivoted on the wheel *g*, with its axles resting on the side frames *c c*, motion being given to it by the pinion *h* on the wheel *o*, from the motion of the shaft of the wheel *g*, or at any other point, if desired. The indicator may be made to move to give the result of the operation of the meter.

The operation will be as follows: When a column of grain is made to flow into the hopper *a*, with gate B closed, it will require a certain amount of grain to overcome the resistance of the beam *d* and weight *w*, when the hopper will receive a full head or full port before the gate B opens by the descent of the hopper. The column of grain will then fall down on the wheel *o*, and give motion to the same and other parts by the weight or gravity of the same. After the column leaves the wheel *o* it falls into the fixed hopper *b* below, and then passes through the port of the same, when it is directed by the shifting valve J alternately to the inclined troughs *k k* for bagging in specific quantities, or to be delivered in the aggregate amount, automatically.

In this arrangement no change of column can occur in point of capacity, unless purposely designed, avoiding the inaccuracies experienced in the usual method of weighing. In this mode a truthful result is attained by the uniform head or column continually passing through the meter when let on or cut off. The capacity of the column being fixed or determined by the gate *a x*, no error can occur from this fact. The gravity of the grain, however, does vary. Therefore we meet this point by the effect of the same on the velocity or motion of the wheel *o*. When the grain varies in gravity, so does likewise the rotations of the wheel *o* in like proportion—as, for example, we will run the meter with grain for any limit of time. If this quantity is carefully and exactly weighed afterward on a scale now used, and we find it weighs two hundred and forty pounds, and find the indicator gives forty-four revolutions in that limit of time, we have a data established for all future operations.

Now, suppose we run the meter subsequently for ten hours with wheat. To find the result we make the following statement, viz: As forty-four revolutions is to two hundred and forty pounds wheat, so is ten thousand revolutions indicated in the ten hours running of the meter to the required amount—on the principle of truth that "equals are equal." If we find, by dividing the data of the limit of time rotations, that there are any fractional parts, more or less, remaining, after the equals are deducted from the subsequent runnings of the meter, the rotations will be equal, if the gravity of the grain has not varied; but if the gravity of the grain has changed, the fractional parts, more or less, will appear beside the equals, and as each revolution of the wheel $o$ by the data obtained will be equal to so many pounds, the fractional parts can be properly estimated and added to the pounds of the equals, thus giving a truthful result. No matter how much the gravity of the column may vary or change, the rotation of the wheel $o$ will, relatively, in proportion to that change, follow, maintaining under all circumstances a perfect equilibrium during the operation of the meter, minus or plus the fractions.

By the use of the above elements I can give a truthful result of any quantity or quality of grain running under a continuous flow, and dispose of the same in specific quantities or in aggregate bulk automatically.

What I claim is—

The combination of the swinging hopper, the compartment-wheel, the fixed or silent hopper and port, the shifting valve, the inclined troughs, and registering apparatus, substantially as and for the purpose represented and described.

WM. SCHNEBLY.

Witnesses:
  M. C. GILLHAM,
  ROBT. GILLHAM.